United States Patent Office 3,257,394
Patented June 21, 1966

3,257,394
SUBSTANTIVE METHINE DYES
Werner Victor Cohen, Newark, Del., assignor to E. I. du Pont de Nemours and Company, Wilmington, Del., a corporation of Delaware
No Drawing. Filed Aug. 20, 1962, Ser. No. 218,146
5 Claims. (Cl. 260—240.9)

The present invention is directed to novel methine direct dyes that are substantive to cellulosic fibers and, accordingly, are particularly useful for coloring paper or paper pulp without the use of rosin size and alum to afford colored household tissue papers. These novel dyes may also be used to color sized paper.

It is an object of the present invention to provide novel direct yellow dyes that are superior in strength and brightness to any known direct yellow dyes for paper. A further object is to provide such dyes which effect considerable economy, both with respect to manufacture and with respect to the high degree with which the dyes are exhausted onto paper from the extreme dilutions commonly used in paper making machines. Other objects are to provide dyes that are compatible with numerous anionic dyes and additives used in paper manufacture. Also, this invention provides direct paper dyes which fall outside the yellow range and also provides dyes which, in admixture with blue paper dyes, provide strong and bright green shades.

These and other objects are achieved by condensing an N-aryl cyanoacetamide, as herein described with a derivative of p-aminobenzaldehyde or of p-aminocinnamaldehyde.

More specifically, the present invention is directed to a novel compound of the formula

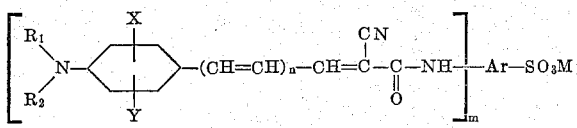

wherein Ar—SO$_3$M is a radical selected from the group consisting of

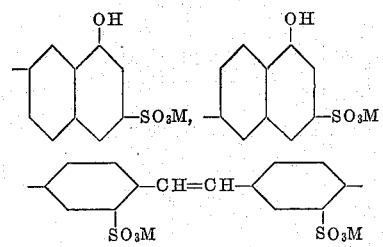

and

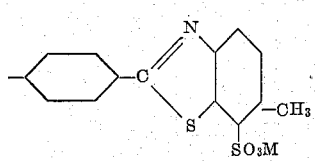

$n$ is zero or 1; $m$ is 1–2 as required by the valence of the —ArSO$_3$M radical; $R_1$ and $R_2$ may be alike or different and are selected from the group of radicals consisting of alkyl, benzyl, 2-phenylethyl, 2-hydroxyethyl, 2-cyanoethyl, 2-chloroethyl, 2-bromoethyl, alkoxymethyl, 2-alkoxyethyl, 2-(2-hydroxyethoxy)ethyl; X and Y may be alike or different and are selected from the group of radicals consisting of hydrogen, alkyl, alkoxy, fluorine, chlorine and bromine, wherein all the alkyl and alkoxy radicals have from 1 to 4 carbon atoms, and M represents hydrogen, an alkali metal or the ammonium radical.

Representative examples illustrating the present invention follow.

EXAMPLE 1

An agitated mixture consisting of 5.5 parts of 4,4'-bis(cyanoacetamido)-2,2'-stilbenedisulfonic acid, disodium salt, 3.0 parts of p-dimethylaminobenzaldehyde, 16 parts of ethanol and 0.15 part of piperidine is heated at refluxing temperature for 3 hours. A yellow solid is filtered from the cooled reaction mass, washed with ethanol, and dried. It has the structure:

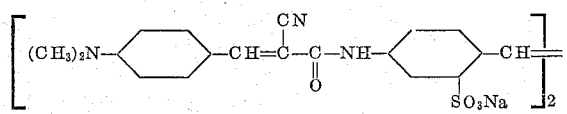

Analyses for C, H, N, S and Na correspond quite closely to the values for these elements as required by theory for the above structure. The dye is almost completely retained on paper pulp without size and alum, and exhibits a strong, bright green-yellow coloration which fluoresces green under ultra violet light. The dye has slight solubility in water.

The dye of the present example is converted to a free sulfonic acid by either treating its aqueous solution with acid to reduce the pH below 6, or by dipping paper, which is colored with the sodium salt of the dye, into a weak acid solution. Upon acidification, the dye changes in shade from yellow to red. Since alum treated paper is acidic, an attractive red shade is readily obtained on this substrate by using the dye of the present example.

EXAMPLE 2

(a) An efficiently agitated mixture consisting of 8.2 parts of 6-(cyanoacetamido)-1-naphthol-3-sulfonic acid, sodium salt, 3.73 parts of p-dimethylaminobenzaldehyde, 76 parts of ethanol, 0.25 part of piperidine and 9.5 parts of N,N-dimethylacetamide is heated at refluxing temperature for 3 hours. During this time the reaction mass gradually changes in hue from greenish-buff to orange. The mass is cooled, the yellow dye is filtered off, washed with ethanol, and dried. It has the structure:

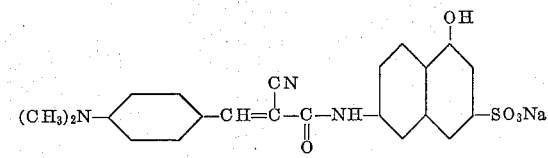

Correct analyses are obtained for the elements; C, H, N, S and Na. The dye is highly substantive to bleached sulfite pulp without size and alum, and affords a strong, bright, green-yellow color on paper made therefrom. This dye is only slightly soluble in water but is quite soluble in N,N-dimethylformamide.

(b) When 8.2 parts of 7-(cyanoacetamido)-1-naphthol-3-sulfonic acid, sodium salt are used in part (a) of this example in lieu of its 6-cyanoacetamido isomer, the isomeric dye having similar properties is obtained.

c) When a molar equivalent of 4-(diethylamino)-2-methylbenzaldehyde is used in part (a) of this example in lieu of p-dimethylaminobenzaldehyde, a substantive yellow paper dye of the following structure is obtained:

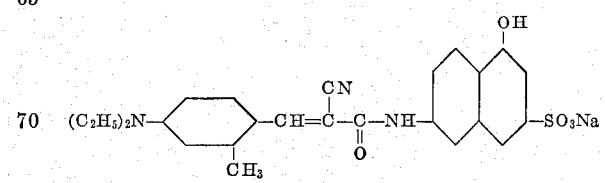

An aqueous solution of this dye exhibits an absorption maximum at 454 millimicrons, and from methanol solution a peak at 436 millimicrons.

EXAMPLE 3

An agitated mixture consisting of 10.3 parts of 2-[p-(cyanoacetamido)phenyl] - 6 - methyl-7-benzothiazolesulfonic acid, sodium salt, 4.1 parts of p-dimethylaminobenzaldehyde, 24 parts of ethanol and 0.15 part of piperidine is heated at refluxing temperature for 3 hours. The reaction mass is cooled, the precipitate is filtered off, washed with ethanol and dried. The bright yellow crystalline product thus obtained has the structure:

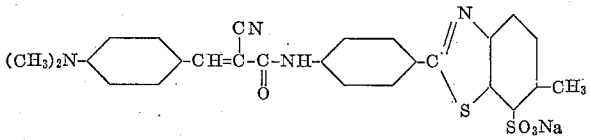

The dye is soluble in N,N-dimethylformamide but only slightly soluble in water. It is essentially completely retained on bleached sulfite pulp without size and alum, and exhibits a strong, bright, green-yellow color on paper made therefrom, and fluoresces green under ultra violet light.

EXAMPLE 4

An agitated mixture consisting of 32.8 parts of 7-(cyanoacetamido)-1-naphthol-3-sulfonic acid, sodium salt, 500 parts of isopropyl alcohol, 16.4 parts of p-dimethylaminobenzaldehyde and 2 parts of piperidine is heated at the refluxing temperature for 12 hours. The cooled mass is filtered and the yellow solid is washed with isopropyl alcohol and then with warm acetone. The dried product is obtained in excellent yield.

An aqueous solution of the dye exhibits an absorption maximum at 438 millimicrons. The dye is substantive to paper pulp without mordanting aids such as size and alum, and confers a strong green-yellow color to paper. By following the procedure of the present example, except that equivalent amounts of various aldehydes and N-aryl cyanoacetamides are employed in the condensation reaction, one obtains substantive paper dyes whose absorption maxima are listed in Table I. $R_1$ and $R_2$ in the table are the substitutents on the nitrogen atom of the p-aminobenzaldehyde component and "N-aryl" refers to the aminoarylsulfonic acid, sodium salt component of the dye whose structure is represented as follows:

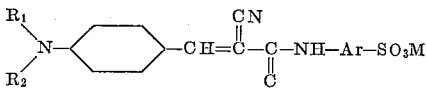

The key used in the table for the "N-aryl" component is as follows:

(I) 4,4'-diamino-2,2'-stilbenedisulfonic acid, disodium salt.
(II) 6-amino-1-naphthol-3-sulfonic acid, sodium salt.
(III) 7-amino-1-naphthol-3-sulfonic acid, sodium salt.
(IV) 2-(p-aminophenyl)-6-methyl - 7 - benzothiazolesulfonic acid, sodium salt.

The corresponding N-aryl cyanoacetamides are prepared from an alkyl cyanoacetate and an amino compound taken from the above group I to IV or, optionally, from any alkali metal salt of one of these amines.

More specifically, the N - aryl cyanoacetamides are prepared by heating an alkyl ester of cyanoacetic acid with the salt of aminoarylsulfonic acid at a temperature of from 150° to 175° C. in a solvent such as N,N-dimethylacetamide and optionally in the presence of an alkaline compound such as sodium carbonate or an alkali metal alcholate such as sodium methylate or in the presence of both of these.

These N-aryl cyanoacetamides have the formula

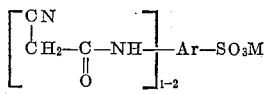

wherein the arylsulfonic acid radical Ar—SO$_3$M is a member of the group consisting of (a)

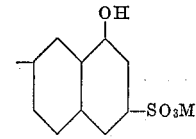

(b)

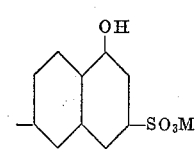

(c)

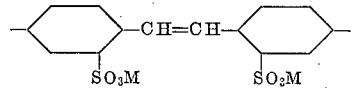

and (d)

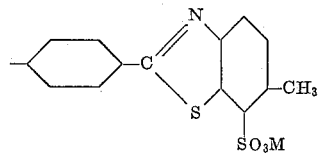

M is selected from the group consisting of H, alkali metals, alkaline earth metals and NH$_4$.

The preceding is a general method of preparation for applicant's new N-aryl cyanoacetamides as described and claimed in his copending application Serial No. 218,127, filed August 20, 1962, now abandoned; however, the inventive subject matter of this abandoned application is covered by appropriate divisional continuation applications and there has been no abandonment of the invention claimed in said abandoned application herein initially identified by applicant as "copending case OR–3617."

*Table I*

| Ex. | $R_1$ | $R_2$ | N-aryl from— | Absorption maxima in millimicrons, measured in— | |
|---|---|---|---|---|---|
| | | | | Water | Methanol |
| (a) | CH$_3$ | CH$_3$ | I | 438 | 418 |
| (b) | C$_2$H$_5$ | CH$_2$CH$_2$OH | I | 448 | 416 |
| (c) | C$_2$H$_5$ | C$_6$H$_5$CH$_2$ | I | 440 | 418 |
| (d) | CH$_3$ | CH$_3$ | II | 436 | 417 |
| (e) | C$_2$H$_5$ | C$_2$H$_5$ | II | 443 | 425 |
| (f) | CH$_3$ | C$_2$H$_5$ | II | 439 | 422 |
| (g) | C$_2$H$_5$ | CH$_2$CH$_2$OH | II | 436 | 424 |
| (h) | CH$_3$ | CH$_2$CH$_2$CN | II | 418 | 405 |
| (i) | C$_2$H$_5$ | CH$_2$CH$_2$CN | II | 426 | 412 |
| (j) | C$_2$H$_5$ | C$_6$H$_5$CH$_2$ | II | 433 | 412 |
| (k) | CH$_3$ | C$_6$H$_5$CH$_2$ | II | 431 | 410 |
| (l) | C$_2$H$_5$ | CH$_2$CH$_2$Cl | II | 432 | 410 |
| (m) | CH$_3$ | CH$_3$ | III | 438 | 424 |
| (n) | C$_2$H$_5$ | C$_2$H$_5$ | III | 443 | 432 |
| (o) | C$_2$H$_5$ | CH$_2$CH$_2$OH | III | 440 | 423 |
| (p) | CH$_3$ | CH$_3$ | IV | 447 | 423 |
| (q) | C$_2$H$_5$ | C$_2$H$_5$ | IV | 452 | 430 |
| (r) | CH$_3$ | C$_2$H$_5$ | IV | 450 | 428 |
| (s) | C$_2$H$_5$ | CH$_2$CH$_2$OH | IV | 448 | 427 |
| (t) | C$_2$H$_5$ | C$_6$H$_5$CH$_2$ | IV | 438 | 420 |

EXAMPLE 5

An agitated mixture consisting of 5.1 parts of 2-[p-(cyanoacetamido)phenyl]-6-methyl - 7 - benzothiazolesulfonic acid, sodium salt, 2.41 parts of p-dimethylaminocinnamaldehyde, 12 parts of ethanol and 0.1 part of piperidine is heated at refluxing temperature for 3 hours. The crystalline product is filtered from the cooled reaction mass, washed with ethanol, and dried. It has the structure:

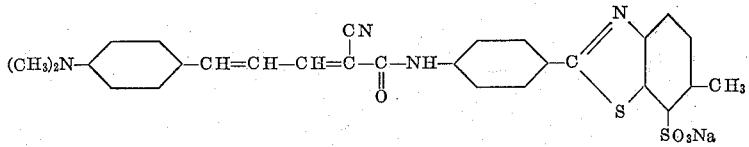

This dye is soluble in N,N-dimethylformamide but only very slightly soluble in water. The dye is substantive to paper giving a scarlet shade.

By following the procedure of the present example, except that equivalent amounts of various p-tertiary-aminocinnamaldehydes and N-aryl cyanoacetamides are condensed, one obtains substantive paper dyes whose absorption maxima are listed in Table II. $R_1$ and $R_2$ in the table refer to substituents shown in the general formula:

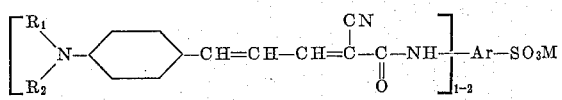

and the "N-aryl" component for this structure, keyed as I to IV in Table II, follow the same definitions as given for Table I above.

*Table II*

| Ex. | $R_1$ | $R_2$ | N-aryl, from— | Absorption maxima in millimicrons, measured in— | |
|---|---|---|---|---|---|
| | | | | Water | Methanol |
| (a) | $CH_3$ | $CH_3$ | II | 473 | 460 |
| (b) | $C_2H_5$ | $C_2H_5$ | II | 480 | 470 |
| (c) | $CH_3$ | $CH_3$ | III | 475 | 462 |
| (d) | $CH_3$ | $CH_3$ | IV | 503 | 466 |
| (e) | $C_2H_5$ | $C_2H_5$ | IV | 490 | 487 |

Substantive paper dyes of similar shade are obtained when the $R_1$ and $R_2$ radicals in the compounds of Table II are alike or different, and are selected from the group listed for $R_1$ and $R_2$ in the preceding specification after the objects. Likewise, similar dyes are obtained by condensing any p-$R_1R_2$N-cinnamaldehyde with any of the N-aryl cyanoacetamides exemplified in this invention.

EXAMPLE 6

Typical dyeing procedure: One-tenth (0.1) part of the dye prepared in Example 2 is added to an aqueous slurry of 100 parts (dry basis) of bleached sulfite pulp in 5000 parts of water at 2° to 38° C. The mixture is thoroughly agitated for 10 to 20 minutes and water is added to give a total of 20,000 parts. Paper sheet is then made up in the manner well known in the art of paper making to provide paper which is dyed a bright green-yellow shade. A medium to strong shade is obtained.

The amount of dye employed may be varied from 0.005 to 1.0 part to give lightly tinted to deeply colored dyeings. The percent by weight of air dried paper pulp in the initial slurry may vary from 0.4 to 3. Use of rosin size and alum is optional and, if used, may vary from about 0.5 to 3 parts and from 1 to 4 parts, respectively. Since the dyes of this invention are highly substantive to paper pulp, the use of size and alum is omitted when paper stock for use in paper tissues and the like is being dyed.

EXAMPLE 7

A strip of paper is dipped into a 1% aqueous solution of 6-(cyanoacetamido)-1-naphthol-3-sulfonic acid, sodium salt. A rod, wetted by dipping into a 1% solution of p-dimethylaminobenzaldehyde in a 1:1 water-alcohol solvent containing a drop of piperidine, is drawn across the moist strip of paper. The paper is placed over a glass tube heated internally with steam. A yellow color develops where the rod was drawn across the paper.

This general method is useful for the surface dyeing of paper by first applying any of the substantive cyanoacetamides described in the present application to the paper pulp at the wet end of the paper making machine, followed by forming the paper sheet, contacting the latter with a solution of reactive color former, such as any of the herein disclosed aldehydes, and heating to dry the paper and develop the dye.

The N-aryl cyanoacetamides herein described complete the list in this category because of the very specific structures which satisfy the substantivity requirements of the derived methine dyes.

The aldehydes heretofore described represent two main aldehyde structures and are disclosed in the examples, those derived from (a) benzaldehyde and (b) cinnamaldehyde. These are substituted in p-position with a tertiary amino group. The alkyl groups on the p-nitrogen atom may be the same or different and may be, themselves, substituted by radicals of the group; cyano, hydroxyl, alkoxy, 2-hydroxyethoxy, phenyl, chlorine or bromine. The benzene ring of the aldehyde may be substituted by alkyl, alkoxy, fluorine, chlorine or bromine. All alkyl groups are short-chain alkyls having 1 to 4 carbon atoms.

Specific aldehydes of the preceding general types which may be used in this invention are the following:

p-(Isobutylmethylamino)benzaldehyde,
p-(Dibutylamino)benzaldehyde,
p-(Ethylphenethylamino)benzaldehyde,
p-(Diphenethylamino)benzaldehyde,
p-(Dibenzylamino)benzaldehyde,
p-[Bis(2-chloroethyl)amino]benzaldehyde,
p-[Bis(2-bromoethyl)amino]benzaldehyde,
p-[Bis(2-hydroxyethyl)amino]benzaldehyde,
p-[Bis(2-cyanoethyl)amino]benzaldehyde,
p-[(Ethoxymethyl)propylamino]benzaldehyde,
p-[Bis(propoxymethyl)amino]benzaldehyde,
p-[(2-Ethoxyethyl)ethylamino]benzaldehyde,
p-[Bis(2-methoxyethyl)amino]benzaldehyde,
p-[(2-[2-Hydroxyethoxy]ethyl)methylamino]benzaldehyde,
p-[Bis(2-[2-hydroxyethoxy]ethyl)amino]benzaldehyde,
3-Butyl-4-dimethylaminobenzaldehyde,
2-Butoxy-4-diethylaminobenzaldehyde,
4-(Benzylmethylamino)-6-methyl-m-anisaldehyde,
2,6-Diethyl-4-[(2-[2-hydroxyethoxy]ethyl)methylamino]benzaldehyde,
6-Chloro-4-diethylamino-m-tolualdehyde,
4-[(2-cyanoethyl)ethylamino]-2-fluorobenzaldehyde,
4-[Bis(2-hydroxyethyl)amino]-3-bromobenzaldehyde,
4-(Butylmethylamino)cinnamaldehyde,
2,6-Dichloro-4-dimethylaminobenzaldehyde,
2-Ethoxy-4-[(ethoxymethyl)ethylamino]-5-fluorobenzaldehyde,
4-(Benzylmethylamino)-2-chloro-6-fluorocinnamaldehyde and
4-[(2-Chloroethyl)(2-hydroxyethyl)amino]-5-ethoxy-2-methylcinnamaldehyde.

Operative solvents for the condensation reaction are not critical. Disclosed in the representative examples are ethanol, isopropyl alcohol and a mixture of ethanol and N,N-dimethylacetamide. Alcoholic solvents are preferred because of their convenience (boiling point), availability and low cost. The ether-alcohol solvents such as the monomethyl (or ethyl) ether of ethylene glycol or diethylene glycol may also be employed. Other operable solvents include N,N-dimethylformamide, N,N-diethylacetamide, dimethylsulfoxide, pyridine and the like. Mixtures of these solvents, with or without considerable amounts of water may also be used.

Operable catalysts which may be utilized include the following strong bases; morpholine, piperidine, sodium methylate, tetramethylammonium hydroxide and the like.

M in the preceding general formulas represents hydrogen, an alkali metal or ammonium. The Na salt is preferred, and is used by way of illustration in the examples. Preparation of the various salt forms, also isolation of the free acid, SO₃H, form of the intermediates and dyes and conversion of these to the various salt forms are illustrated by the following alternate routes: (1) The four aminoarylsulfonic acid compounds, I to IV (see Table I), as free acid, are employed in the reaction with ethyl cyanoacetate in the presence of an alkali and/or an alkali alcoholate as in my described copending application Serial No. 218,127, filed August 20, 1962, now abandoned. The alkali salt is the reactive form. Suitable alkalies for use in this reaction are; the hydroxides, carbonates or bicarbonates of lithium, sodium or potassium. Suitable alkali alcoholates are: sodium, lithium or potassium methylate, ethylate and the like. The resulting alkali metal salts of the cyanoacetamido-arylsulfonic acids are condensed with various aldehydes, by processes described in the above examples, to provide the respective alkali metal salts of the final methine dyes. (2) The cyanoacetamido-arylsulfonic acids, sodium salts, employed as starting materials in the above examples, are treated with aqueous hydrochloric or sulfuric acid, filtered off and dried. The free acids thus obtained, are agitated with aqueous ammonium hydroxide, and dried, to provide the ammonium salts of the cyanoacetamido-arylsulfonic acids. (3) The free acid form of the amidosulfonic acids may also be employed in the processes of the above examples to provide the final dyes in the form of their free acids. When the final dyes are isolated as the organic base salts of the sulfonic acids, in view of the base catalysts employed or because of the presence of dialkyl amines that are formed by partial hydrolysis of amide solvents, these dye salts are converted, if desired, to the free acids by treatment with dilute mineral acid. (4) The free acid form of the methine dyes is converted to the alkali metal or ammonium salt by treatment in aqueous solution with an alkali selected from those mentioned above. The salt forms thus obtained are isolated by drying, or by salting, filtration and drying.

The preceding representative examples may be varied within the scope of the present total specification disclosure as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

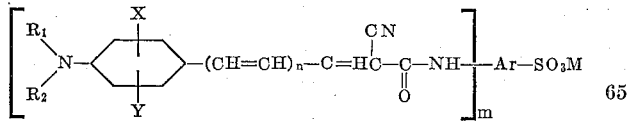

wherein Ar—SO₃M is a radical selected from the group consisting of

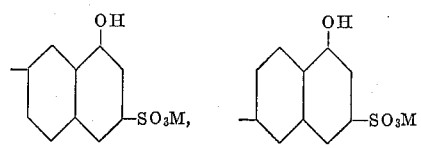

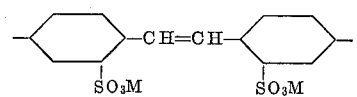

and

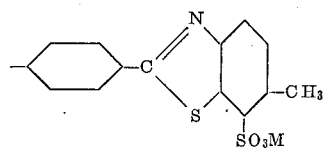

$n$ is zero or 1; $m$ is 1–2 as required by the valence of the —ArSO₃M radical; $R_1$ and $R_2$ are selected from the group of radicals consisting of alkyl, benzyl, 2-phenylethyl, 2-hydroxyethyl, 2-cyanoethyl, 2-chloroethyl, 2-bromoethyl, alkoxymethyl, 2-alkoxyethyl, 2-(2-hydroxyethoxy)ethyl; X and Y are selected from the group of radicals consisting of hydrogen, alkyl, alkoxy, fluorine, chlorine and bromine, wherein all the alkyl and alkoxy radicals have from 1 to 4 carbon atoms, and M represents hydrogen, an alkali metal or the ammonium radical.

2. The compound

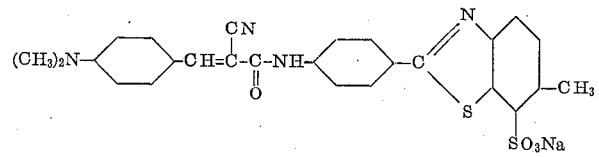

3. The compound

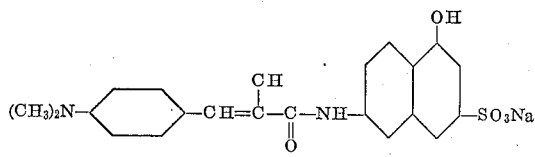

4. The compound

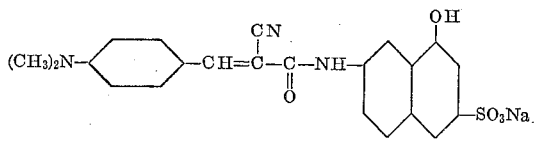

5. The compound

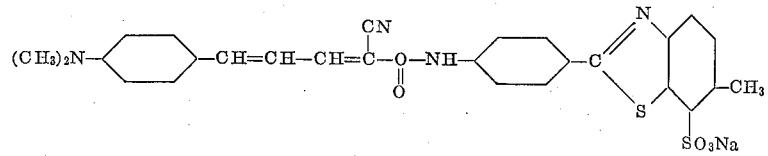

(References on following page)

References Cited by the Examiner

UNITED STATES PATENTS

| | | | |
|---|---|---|---|
| 1,950,421 | 3/1934 | Wahl | 260—240.9 X |
| 2,043,081 | 6/1936 | Wahl | 260—240.9 X |
| 2,374,880 | 5/1945 | Mueller | 260—465 |
| 2,688,541 | 9/1954 | Ganguin et al. | 260—240.9 |
| 3,018,287 | 1/1962 | Fleck | 260—240 |
| 3,066,005 | 11/1962 | Wedemeyer et al. | 8—54.2 |
| 3,072,650 | 1/1963 | Semb et al. | 260—240 |
| 3,082,052 | 3/1963 | Booth et al. | 8—54.2 |

OTHER REFERENCES

Lubs: Chemistry of Synthetic Dyes and Pigments (New York, 1955), pages 88–91 and 670 and 671.

Lubs: Chemistry of Synthetic Dyes and Pigments (New York, 1955), pages 248–54.

Neblette: Photography, 4th Ed., page 348, Van Nostrand and Co. (1943).

WALTER A. MODANCE, *Primary Examiner.*

NICHOLAS S. RIZZO, JOHN D. RANDOLPH,
*Examiners.*

A. D. ROLLINS, *Assistant Examiner.*